US011006282B2

(12) United States Patent
Magzimof et al.

(10) Patent No.: US 11,006,282 B2
(45) Date of Patent: May 11, 2021

(54) OPTIMIZING WIRELESS NETWORKING USING A VIRTUAL GEOGRAPHIC INFORMATION SYSTEM OVERLAY

(71) Applicant: Phantom Auto Inc., Mountain View, CA (US)

(72) Inventors: Shay Magzimof, Palo Alto, CA (US); David Parunakian, Moscow (RU)

(73) Assignee: Phantom Auto Inc., Mountain View, CA (US)

( * ) Notice: Subject to any disclaimer, the term of this patent is extended or adjusted under 35 U.S.C. 154(b) by 115 days.

(21) Appl. No.: 16/382,555

(22) Filed: Apr. 12, 2019

(65) Prior Publication Data

US 2019/0320328 A1    Oct. 17, 2019

Related U.S. Application Data

(60) Provisional application No. 62/656,958, filed on Apr. 12, 2018.

(51) Int. Cl.
*H04W 16/22*         (2009.01)
*H04W 28/02*         (2009.01)
(Continued)

(52) U.S. Cl.
CPC ............. *H04W 16/22* (2013.01); *H04W 4/02* (2013.01); *H04W 16/18* (2013.01); *H04W 28/0226* (2013.01); *H04W 28/0231* (2013.01); *H04W 28/0289* (2013.01); *H04W 28/06* (2013.01); *H04W 48/18* (2013.01);
(Continued)

(58) Field of Classification Search
CPC ....... H04W 4/02; H04W 16/18; H04W 16/22; H04W 28/0231; H04W 28/0289; H04W 28/06; H04W 48/18; H04W 64/006; H04W 72/085; H04W 76/15
See application file for complete search history.

(56) References Cited

U.S. PATENT DOCUMENTS 9,900,251 B1 * 2/2018 Wang ................... H04L 47/11
2011/0090922 A1 * 4/2011 Wang ................... H04L 65/4092
370/465

(Continued)

OTHER PUBLICATIONS

Abouzeid, A. A. et al., "TCP in Networks with Abrupt Delay Variations and Random Loss," IEEE, Feb. 2001, pp. 726-730.
(Continued)

*Primary Examiner* — Brian P Cox
(74) *Attorney, Agent, or Firm* — Fenwick & West LLP

(57) ABSTRACT

In a connected vehicle environment, network connection parameters such as a network congestion window and bit rate are automatically adjusted dependent on a location of a vehicle in order to optimize network performance. A geospatial database stores learned relationships between network performance of a connected vehicle at different physical locations when configured in accordance with different network parameters. The vehicle can then adjust its network parameters dynamically dependent on its location. A vehicle may maintain multiple connections to different networks concurrently for transmitting duplicate data of a data stream, with the vehicle independently adjusting parameters associated with different networks to optimize performance.

20 Claims, 8 Drawing Sheets

(51) Int. Cl.

| | | |
|---|---|---|
| *H04W 16/18* | (2009.01) | |
| *H04W 64/00* | (2009.01) | |
| *H04W 48/18* | (2009.01) | |
| *H04W 76/15* | (2018.01) | |
| *H04W 72/08* | (2009.01) | |
| *H04W 4/02* | (2018.01) | |
| *H04W 28/06* | (2009.01) | |

(52) U.S. Cl.
 CPC ....... *H04W 64/006* (2013.01); *H04W 72/085* (2013.01); *H04W 76/15* (2018.02)

(56) References Cited

U.S. PATENT DOCUMENTS

| | | | | |
|---|---|---|---|---|
| 2012/0182935 | A1* | 7/2012 | Addepalli | H04W 36/026 370/328 |
| 2014/0200038 | A1* | 7/2014 | Rao | G01C 21/32 455/457 |
| 2014/0362712 | A1* | 12/2014 | Agarwal | H04W 24/00 370/252 |
| 2017/0222901 | A1* | 8/2017 | Jain | G06F 16/9537 |
| 2019/0166534 | A1* | 5/2019 | Williammee | H04W 36/14 |

OTHER PUBLICATIONS

Altman, E. et al., "A Stochastic Model of TCP/IP with Stationary Random Losses," SIGCOMM '00: Proceedings of the conference on Applications, Technologies, Architectures, and Protocols for Computer Communication, Aug. 2000, pp. 231-242.
Arianpoo, N. et al., "How network monitoring and reinforcement learning can improve tcp fairness in wireless multi-hop networks," EURASIP Journal on Wireless Communications and Networking, Dec. 2016, pp. 1-15.
Balakrishnan, H. et al., "A comparison of mechanisms for improving TCP performance over wireless links," IEEE/ACM Transactions on Networking, 5(6), Dec. 1997, pp. 756-769.
Barman, D. et al., "Effectiveness of loss labeling in improving TCP performance in wired/wireless networks," Proceedings—10th IEEE International Conference on Network Protocols, Dec. 2002, pp. 1-10.
Blanc, A. et al., "Compound TCP with random losses," International Conference on Research in Networking, May 2009, pp. 482-494.
Bregni, S. et al., "Enhanced loss differentiation algorithms for use in TCP sources over heterogeneous wireless networks," IEEE Global Telecommunications Conference, Dec. 2003, pp. 1-5.
Carlucci, G. et al., "Analysis and design of the google congestion control for web real-time communication (WebRTC)," Proceedings of the 7th International Conference on Multimedia Systems—MMSys '16, May 2016, pp. 1-12.
Cen, S. et al., "End-to-end differentiation of congestion and wireless losses," IEEE/ACM Transactions on Networking, 11(5), Oct. 2003, pp. 703-717.
Cheng, R.-S. et al., "Congestion control with dynamic threshold adaptation and cross-layer response for TCP Vegas over IEEE 802.11 wireless networks," International Journal of Communication Systems, Feb. 2013, pp. 2918-2930.
Cicco, L. et al., "TCP Congestion Control over Hsdpa: An Experimental Evaluation," 2014 22nd Mediterranean Conference on Control and Automation (MED), Jun. 2014, pp. 1043-1048.
Edwan, T. A., "Improved algorithms for TCP congestion control," Doctoral Thesis, Loughborough University, Aug. 2010, pp. 1-220.
Elaarag, H. et al., "Using fuzzy inference to improve TCP congestion control over wireless networks," Proceedings of the 15th Communications and Networking Simulation Symposium, Mar. 2012, pp. 1-7.
Floyd, S. et al., "Random Early Detection Gateways for Congestion Avoidance," IEEE/ACM Transactions on Networking, 1(4), Aug. 1993, pp. 397-413.

Fonseca, N. et al., "Bayesian Packet Loss Detection for TCP," Proceedings 24th Annual Joint Conference of the IEEE Computer and Communications Societies. (INFOCOM 2005), Mar. 2005, pp. 1826-1837.
Geurts, P. et al., "A machine learning approach to improve congestion control over wireless computer networks," Fourth IEEE International Conference on Data Mining (ICDM'04), Nov. 2004, pp. 383-386.
Guo, D. et al., "Bayesian inference of network loss and delay characteristics with applications to TCP performance prediction," IEEE Transactions on Signal Processing, 51(8), Aug. 2003, pp. 2205-2218.
Haley, P. J. et al., "Neural Generalized Predictive Control," NASA Technical Memorandum 110244, Feb. 1997, pp. 1-17.
Jayaraj, A. et al., "Loss classification in optical burst switching networks using machine learning techniques: improving the performance of TCP," IEEE Journal on Selected Areas in Communications, 26(6), Aug. 2008, pp. 45-54.
Johansson, I. et al., "Self-Clocked Rate Adaptation for Multimedia," Internet Engineering Task Force (IETF), Dec. 2017, pp. 1-36.
Khurshid, A. et al., "Modified TCP New Reno for wireless networks," 2015 International Networking Systems and Security (NSysS), Jan. 2015, pp. 1-6.
Lakshman, T. V. et al., "TCP/IP performance with random loss and bidirectional congestion," IEEE/ACM Transactions on Networking, 8(5), Oct. 2010, pp. 541-555.
Lakshman, T. V. et al., "The performance of TCP/IP for networks with high bandwidth-delay products and random loss," IEEE/ACM Transactions on Networking, 5(3), Jun. 1997, pp. 336-350.
Lar, S. et al., "An initiative for a classified bibliography on TCP/IP congestion control," Journal of Network and Computer Applications, Jan. 2013, pp. 126-133.
Li, W. et al., "Dynamic Generalization Kanerva Coding in Reinforcement Learning for TCP Congestion Control Design (Extended Abstract)," Proc. of the 16th International Conference on Autonomous Agents and Multiagent Systems (AAMAS 2017), May 2017, pp. 1598-1600.
Lochert, C. et al., "A survey on congestion control for mobile ad hoc networks," Wireless Communications and Mobile Computing, 7(5), Apr. 12, 2007, pp. 655-676.
Lovewell, R. et al., "Packet-Scale Congestion Control Paradigm," IEEE/ACM Transactions on Networking, 25(1), Jul. 29, 2016, pp. 306-319.
Ma, C. et al., "A Game Theory Based Congestion Control Protocol for Wireless Personal Area Networks," Journal of Sensors, Dec. 7, 2015, pp. 1-13.
Maheshwari, G. et al., "A Survey on Congestion Control in MANET," International Journal of Computer Science and Information Technologies, 5(2), Mar. 2014, pp. 998-1001.
Mareček, J. "Signalling and obfuscation for congestion control," International Journal of Control, 88(10), Aug. 12, 2015, 2086-2096.
Meier, R. et al., "A Sensor Fusion Based User Interface for Vehicle Teleoperation," Proceedings of the IEEE FSR, vol. 60, Aug. 1999, pp. 653-660.
Milenkoski, A. et al., "Loss Differentiation Algorithms vs. Congestion Control Schemes: Dynamics and Performance," International Journal of Distributed and Parallel Systems, 1(1), Sep. 2010, pp. 13-30.
Mirza, M. et al., "A Machine Learning Approach to TCP Throughput Prediction," IEEE/ACM Transactions on Networking, 18(4), Aug. 2010, pp. 1026-1039.
Mittal, R. et al., "TIMELY: RTT-based Congestion Control for the Datacenter," The 2015 ACM Conference on Special Interest Group on Data Communication (SIGCOMM), Aug. 2015, pp. 537-550.
Parsa, C. et al., "Differentiating congestion vs. random loss: a method for improving TCP performance over wireless links," Wireless Communications and Networking Conference, Sep. 2000, pp. 90-93.
Peng, J., "Performance of TCP Congestion Control in UAV Networks of Various Radio Propagation Models," International Journal of Computer Networks & Communications, 8(2), Mar. 2016, pp. 1-12.

(56) References Cited

OTHER PUBLICATIONS

Sawhney, A. et al., "Congestion Control in Wireless Communication Network Using Fuzzy Logic and Machine Learning Techniques," International Journal of Advanced Research in Electrical, Electronics and Instrumentation Engineering, vol. 3, Issue 11, Oct. 2014, pp. 12825-12832.
Sundaresan, S. et al., "TCP congestion signatures," Internet Measurement Conference, Nov. 2017, pp. 64-77.
Utsumi, S. et al., "A new high-performance TCP friendly congestion control over wireless networks," Journal of Network and Computer Applications, 41(1), Feb. 2014, pp. 369-378.
Wang, Y. et al., "Performance analysis of a feedback congestion control policy under non-negligible propagation delay," Aug. 1991, pp. 149-157.
Widmer, J. et al., "Probabilistic Congestion Control for Non-adaptable Flows," Proceedings of the 12th International Workshop on Network and Operating Systems Support for Digital Audio and Video, May 2002, pp. 13-21.
Winstein, K. et al., "TCP ex Machina: Computer-Generated Congestion Control," Proc. ACM Conference on Communications Architectures, Protocols and Applications (SIGCOMM'13), vol. 43, Aug. 2013, pp. 123-134.
Wu, R.-Q. et al., "An Improved TCP Congestion Control Algorithm of Based on Bandwidth Estimation in Heterogeneous Networks," Journal of Communications, 9(10), Oct. 2014, pp. 792-797.
Zhu, X. et al., "NADA: A Unified Congestion Control Scheme for Real-Time Media," Dec. 2017, pp. 1-26.

\* cited by examiner

2

OPTIMIZING WIRELESS NETWORKING USING A VIRTUAL GEOGRAPHIC INFORMATION SYSTEM OVERLAY

CROSS-REFERENCE TO RELATED APPLICATIONS

This application claims the benefit of U.S. Provisional Application No. 62/656,958 filed on Apr. 12, 2018, the contents of which are incorporated by reference herein.

BACKGROUND

Technical Field

This disclosure relates generally to connected vehicles, and more specifically to controlling network connection parameters of connected vehicles to achieve desired network performance.

Description of the Related Art

The abundance of wireless network operators in urban areas and the general evolution of cellular technologies towards proliferation of low-power base stations with relatively small overlapping areas of efficient communication creates a number of Internet access optimization opportunities for mobile devices. Advanced mobile devices such as autonomous and teleoperated vehicles may have exceptional requirements for networking quality of service that existing techniques have difficulty satisfying at scale.

SUMMARY

A method, non-transitory computer-readable storage medium, and vehicle system controls network parameters of a vehicle. The vehicle establishes a first connection to a first network. Based on sensed information of the vehicle, a predicted future state of the vehicle is determined including future position information. First network performance data of the first network associated with the predicted future state of the vehicle is obtained. Based on the first network performance data, first network parameters associated with the first connection to the first network are obtained that result in a first target predicted quality score associated with the first connection. A communication system of the vehicle is configured according to the first network parameters. The communication system transmits a first data stream over the first network.

In an embodiment, the vehicle may maintain multiple network connections concurrently that redundantly transmit a data stream. Parameters associated with each network connection may be independently adjusted in a dynamic manner to optimize performance.

Additional features and benefits will become apparent from the following drawings and descriptions of the embodiments. Other embodiments and aspects are described in detail herein.

BRIEF DESCRIPTION OF THE DRAWINGS

For a more complete understanding of the embodiments, reference is made to the following description and accompanying drawings, in which.

DETAILED DESCRIPTION

This disclosure describes a system for collecting, storing, and disseminating geographically bound heterogeneous datasets relating to wireless network resource availability. The disclosure furthermore relates to connected vehicles capable of using such a system as a complement to local sensors and computing devices for optimizing their wireless connectivity based on a number of parameters, including but not limited to geographical location, cellular base station proximity and congestion levels, local time, and historical patterns of such parameters. The disclosed embodiments include techniques that rely on multipath network connections served by multiple operators. The disclosed embodiments furthermore include proactive techniques for adjusting network bandwidth and latency requirements of vehicles based on previously collected statistical data and patterns as well as reactive techniques that rely on real-time measurements.

Figure 1:
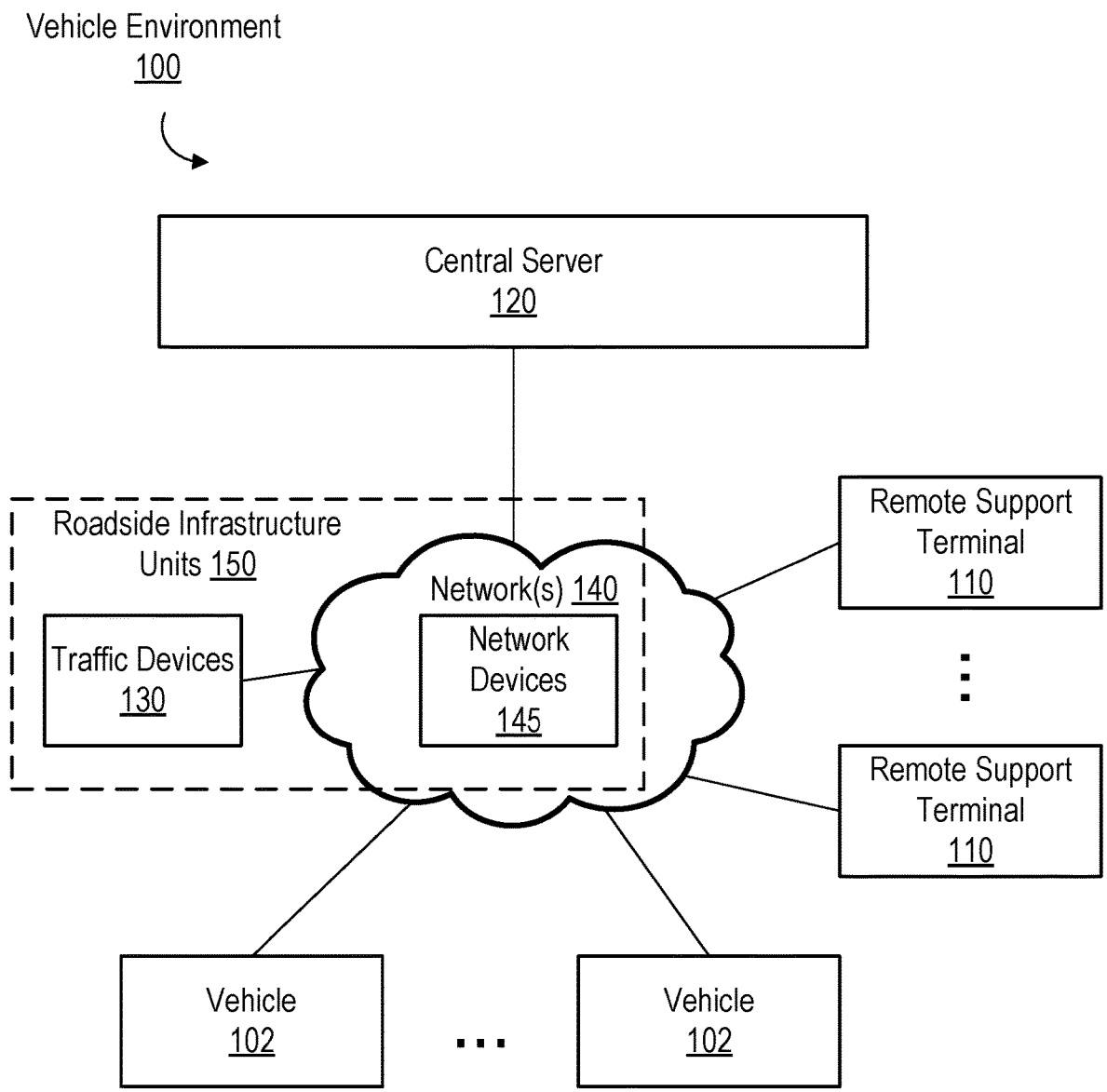
FIG. 1 illustrates an example embodiment of a vehicle environment.

FIG. 1 is a block diagram of a vehicle environment 100 including a plurality of vehicles 102, one or more remote support terminals 110, a central server 120, and roadside infrastructure units 150 that include one or more network devices 145 and one or more mount points such as traffic devices 130. The network devices 145 may collectively form one or more networks 140. In alternative embodiments, the vehicle environment 100 may include different or additional components. Components of the vehicle environment 100 may be implemented as a processor and a non-transitory computer-readable storage medium that stores instructions that when executed cause the processor to perform the functions attributed to the respective components described herein.

The vehicle 102 comprises a land vehicle (e.g. a car or truck), a seaborne vehicle, a subterranean vehicle, an airborne vehicle, or other vehicle. The vehicle 102 may comprise an intelligent transport system (ITS) that connects to one or more networks 140 and communicates with one or more entities via the one or more networks 140 (e.g., the remote support terminal 110, the central server 120, the roadside infrastructure units 150, and/or other vehicles 102) to enable the vehicle 102 to obtain information useful to safe navigation of an environment. In an embodiment, the vehicle 102 may comprise an autonomous or semi-autonomous vehicle that includes an autonomous driving system that automatically controls navigation based on sensed environment conditions. Alternatively, the vehicle 102 may include a non-autonomous vehicle that relies on control inputs from a driver in the vehicle 102 or from a remote teleoperator at a remote support terminal 110. In the case of teleoperation, the vehicle 102 wirelessly receives control inputs via one or more networks 140 that control various components of the drive system such as the steering system, acceleration, braking, etc. The vehicle 102 may also comprise various sensors that capture image data and other environmental data that may be streamed over one or more networks 140 to a remote support terminal 110, to other vehicles 102, or to the central server 120.

The vehicle 102 may rely on a reliable network connection for streaming video or other sensor data to the remote support terminal 110 or other entity and for receiving control commands or data used by the vehicle 102 to navigate in a safe and efficient manner. For example, to provide teleoperation support to a vehicle 102, it is important that the video stream is received at the remote support terminal 110 in real-time with a latency as low as possible. Therefore, the vehicle 102 may switch between different connections to different network devices 145 of the networks 140 or maintain multiple simultaneous connections to optimize the connectivity as will be described in further detail below. In the case of simultaneous connections, the vehicle 102 may transmit a data stream redundantly on two or more networks 140 having different network conditions so that the remote support terminal 110 (or other recipient) can select the stream received with lowest latency or that meets other desired performance characteristics.

The remote support terminal 110 communicates with a vehicle 102 to provide remote teleoperation or other support services. In an embodiment, the remote support terminal 110 may provide teleoperation support in instances when extra assistance is desired. For example, the vehicle 102 may request teleoperation assistance from the remote support terminal 110 when one or more vehicle sensors fail, when an unknown problem occurs with the vehicle's autonomous driving software, when the vehicle 102 encounters a barrier or other hazardous road conditions, or when a passenger manually requests remote assistance. Upon requesting remote support, a video stream capturing the vehicle environment may be provided by the vehicle 102 to the remote support terminal 110 to enable the remote support terminal 110 to assess the situation and take appropriate action. For example, the remote support terminal 110 may provide controls to remotely drive the vehicle 102. The controls may be provided by a human agent that is viewing real-time video captured by the vehicle 102 in a manner that simulates driving of the vehicle 102 from the perspective of the human agent. Alternatively, the controls may be provided by an artificial intelligence agent that executes on the remote support terminal 110 in response to a real-time video feed and other sensor data streamed to the remote support terminal 110 from the vehicle 102.

In other embodiments, the remote support terminal 110 may provide different support to the vehicle 102 that does not necessarily involve teleoperation. For example, the remote support terminal 110 may provide voice support to a driver or passenger of the vehicle 102 in response to video or other sensor data received from the vehicle 102. In other cases, the remote support terminal 110 may provide navigation services to re-route a vehicle 102 or otherwise assist a vehicle 102 in navigating to a destination. In other examples, the remote support terminal 110 may provide software or firmware updates to a vehicle 102.

The traffic devices 130 may incorporate traffic lights or light poles with integrated wireless and computational devices that may provide wireless connectivity to the network 140 or provide processing units to perform computations relating to the functions described herein.

The plurality of networks 140 represents the communication pathways between the vehicles 102, the remote support terminals 110, the roadside infrastructure units 150, and the central server 120. In one embodiment, the networks 140 use standard communications technologies and/or protocols and can include the Internet. In another embodiment, the entities on the networks 140 can use custom and/or dedicated data communications technologies. The plurality of networks 140 may comprise networks of different types such as, for example, a public cellular connection, a dedicated or private wireless network, a low-latency satellite uplink, VANET wireless channels (including vehicle-to-vehicle or vehicle-to-infrastructure links), or any combination thereof. Furthermore, the plurality of networks 140 may include multiple networks of the same type operated by different service providers. The network devices 145 may include cell towers, routers, switches, or other components that provide network services to the entities connected to the plurality of networks 140. The network devices 145 may have varying capabilities and may be spread over a wide geographic area. Thus, different allocations of network resources may be available to vehicles 102 in different locations at different times depending on environmental factors, the capabilities of different network devices 145, and congestion in the area.

The central server 120 collects, processes, and distributes network performance data to enable vehicles to configure network parameters to optimize their respective network connections. For example, in a data collection process, the central server 120 may obtain performance data (e.g., latency, throughput, or other network performance attributes) measured by vehicles 102 at different locations and operating under different network configuration parameters. The central server 120 may process and aggregate the data to identify predicted optimal parameters for vehicles 102 depending on the vehicle state (e.g., location and velocity) and present network conditions. The network performance data may be distributed to vehicles 102 periodically or upon the occurrence of a trigger event. An example of a central server 120 is described in further detail below with respect to FIG. 3.

Figure 2:
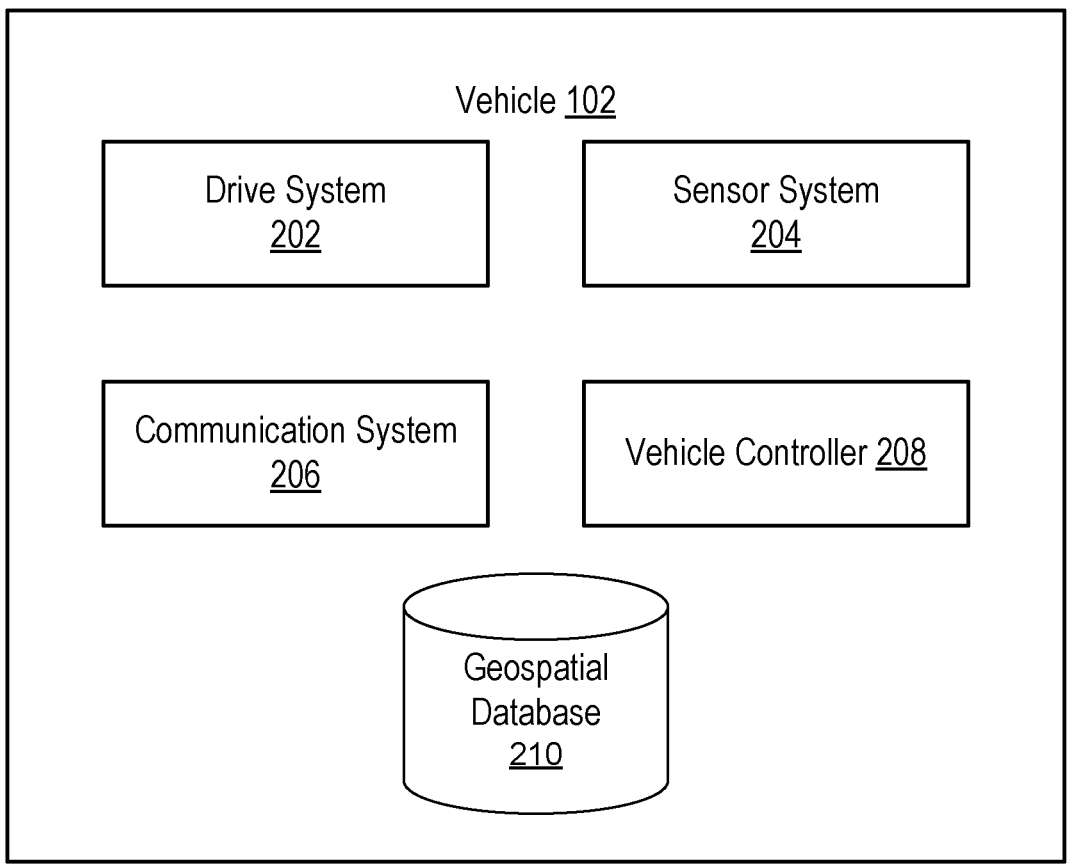
FIG. 2 illustrates an example embodiment of a vehicle system.

FIG. 2 illustrates an example embodiment of a vehicle 102. The vehicle 102 comprises a drive system 202, a sensor system 204, a communication system 206, a vehicle controller 208, and a geospatial database 210. Alternative embodiments may include additional or different components.

The drive system 202 includes standard components for driving a vehicle 102 such as, for example, wheels, axes, transmission, engine, brakes, etc. In an autonomous vehicle, the drive system 202 may furthermore include an autonomous driving system that enables the vehicle 102 to drive autonomously. For example, the autonomous driving system may include hardware and software for enabling the vehicle to automatically navigate a desired route.

The sensor system 204 includes various sensors for capturing environmental data. The captured data may be useful to enable operation of the autonomous driving system, to enable a remote teleoperator to control navigation of the vehicle 102, and/or to provide data to a population of vehicles 102 that enable the population to operate efficiently.

For example, the sensor system 204 may include one or more cameras for capturing video depicting the environment of the vehicle 102. The sensor system 204 may furthermore include proximity sensors, motion sensors, position sensors, temperature sensors, or other sensors for sensing various aspects of the vehicle environment. The sensor system 204 may include one or more geolocation sensors utilizing technology such as GPS, GLONASS or other satellite positioning systems, ground-reference positioning systems such as Assisted GPS, and inertial measurement units (IMU).

The geospatial database 210 stores information about wireless network performance to facilitate proactive manipulation of data packet transmission rates on different networks 140. For example, the geospatial database 210 may include parameters such as cellular base node locations, a radio coverage map based on terrain, locations, and information about structures and other obstacles that may affect wireless transmissions, information about automotive traffic conditions depending on local time, cellular carrier backhaul capabilities and load patterns, information on radio wave propagation due to weather conditions, or other relevant features. The geospatial database 210 may be dynamically updated based on measured network characteristics such as signal strength. For example, the geospatial database 308 may be populated with initial data and may be updated at regular intervals or upon detecting a predefined trigger event based on information collected by the central server 120.

The communication system 206 communicates video, sensor data, or other control signals to the remote support terminal 110, to the central server 120, or directly to other vehicles 102. The communication system 206 may furthermore receive teleoperation or other support signals from the remote support terminal 110 and may receive commands from the central server 120 that control some operation of the vehicle 102. In an embodiment, the communication system 206 comprises one or more modems for communicating over a cellular network, a WiFi network, a Bluetooth network, or other wireless network. The communication system 206 may furthermore include a low-Earth orbit satellite communication subsystem, or a vehicle-to-vehicle or vehicle-to-infrastructure (V2V and V2I, correspondingly) 802.11p VANET communications system. The communication system 206 may furthermore include storage (e.g., a solid state drive) to store data streams locally for later transmission. In one embodiment, the communication system 206 includes a plurality of wireless modems that may establish and maintain multiple network connections concurrently.

In an embodiment, the communication system 206 redundantly transmits a data stream (e.g., a video stream or sensor data stream) via at least two different networks 140. By redundantly transmitting the data stream on multiple networks that may operate under different network conditions and may achieve different performance, a receiver of the data stream (e.g., a remote support terminal 110) may select between the redundant data streams according to a selection criterion. For example, the receiver of the data stream may select the stream with the lowest latency.

The vehicle controller 208 controls operation of the communication system 206 to efficiently utilize network resources. For example, the vehicle controller 208 obtains information about the current vehicle state (e.g., position and motion data from a GNSS receiver or an IMU) to obtain the probability density for the current and expected positions of the vehicle 102 and queries the geospatial database 210 for relevant information corresponding to the vehicle state. The vehicle controller 208 then computes wireless network performance for each connected carrier along the projected vehicle trajectory, and estimates the optimal bandwidth consumption for each link that would still avoid triggering a congestion event. This information may be further utilized by the vehicle controller 208 to enable the communication system 206 to adjust wireless connectivity settings and regulate the data transmission decision-making process.

The vehicle controller 208 uses the result of the network performance computation in a decision process controlling the load on the network paths used for transmitting redundant egress data streams. For example, if there are two network connections available (network A and network B), the vehicle controller 208 determines the data bit rate or encoding quality for both redundant copies of a payload stream. Initially, when the vehicle 102 is close to a network device 145 associated with network A, a higher quality data stream utilizing more bandwidth is sent through network A, with a redundant lower quality data stream utilizing less bandwidth being routed through network B. As the projected capacity of network B grows (e.g., as the vehicle 102 approaches the network device 145 associated with network B), the data rate of the stream routed through B may either grow proportionally to the available bandwidth, or in a manner that leaves a portion of projected network B capacity underutilized in order to enable the wireless connection buffer to be emptied and reduce the time interval at which network B may operate at or beyond its congestion limits. For payload data streams where data encoding quality is not a variable parameter (such as a stream of telemetry messages), the vehicle controller 208 may instead transmit through a lower capacity network only a portion of messages chosen according to some priority criteria, randomly, or otherwise.

In another embodiment, the vehicle controller 208 may exercise explicit control of ingress data streams by sending diagnostic messages, telemetry, or commands to the origin of the data streams (e.g. a remote support terminal 110). The remote support terminal 110 may then increase or decrease data stream bit rates according to the information transmitted by the vehicle controller 208.

The vehicle controller 208 may exercise control of data transmission in a sufficiently rapid manner to adapt to wireless network dynamics normally observed by a vehicle 102 moving at full speed in urban conditions or on a highway as described in further detail below.

In an example scenario, a vehicle 102 equipped with two wireless modems may be connected to two network devices 145 (e.g., cellular nodes) operated by different carriers. The communication system 206 may transmit redundant copies of payload egress traffic via these connections proportionally to their current quality of service, which in turn may depend on multiple factors such as distance between the vehicle 102 and the network devices 145, obstacles between the vehicle 102, and the network devices 145 or backhaul load of each carrier and associated routing delays. The vehicle controller 208 may operate the communication system 206 to avoid transmitting too large a number of packets through a connection that currently has insufficient capacity and thereby avoid causing congestion that may lead to packet loss or buffer growth.

To avoid link congestion, the vehicle controller 208 may track the quality of service for wireless data transmitted over multiple carriers, and facilitate automatic adjustment of the rate of packet transmission through each connection. For example, the vehicle controller may directly impose local limits and restrictions, may discard extra packets according to a predefined rule, or may perform deep packet inspection and re-encoding or downsampling the data streams. The vehicle controller 208 may also share the information on quality of service of wireless networks with the application-level data stream generators and allowing them to react appropriately, thus gradually sending packets at a higher rate through the network device 145 to which the vehicle 102 is approaching, and at a lower rate through the network device 145 from which the vehicle 102 is receding.

In an embodiment, instead of transmitting packets directly to their intended destinations, the packets are instead transmitted to a special proxy server that keeps track of the currently optimal copy of the payload stream as determined using a function depending on stream quality or data rate, transmission latency including the time required to mitigate buffer bloat, maintains an optional intermediate buffer to reduce jitter, and/or performs other functions relevant to the task. The proxy server then forwards the optimal data flow to the destination (for example, a remote support terminal 110 or a central server 120). The proxy server may be embodied in a dedicated server, a virtual machine in the cloud, a cellular or VANET infrastructure node, or elsewhere.

In another embodiment, the vehicle controller 208 also obtains information about the planned vehicle route from the navigation system or other relevant sources and incorporates this information into its decision process. For example, the vehicle controller 208 may anticipate that a vehicle 102 is approaching a location of a network device 145 associated with a network 140 and may select to increase data transmission rate through that network device 145 along the vehicle route and reduce data transmission rate through another network device 145 that is not along the vehicle route.

In a further embodiment, the vehicle controller 208 provides a set of application programming interfaces to notify other components of the vehicle 102 of the expected bandwidth capacity and latency. These methods may be implemented as callable query functions, shared memory access interfaces, ephemeral files, or in any suitable manner. Alternatively, these methods may be bound via an active mechanism such as D-bus, Qt signals and slots, message queues and so on. Different vehicle applications may adapt to these expected values. For instance, a video feed transmission application may reduce the feed encoding quality or resolution to consume less bandwidth.

In an alternative embodiment, the vehicle controller 208 manages a vehicle 102 with a communication system 206 having only a single wireless connectivity device. In this scenario, the communication system 206 may not necessarily switch between carriers. In the situation where vertical handoff management is performed automatically and either cannot be influenced directly, or cannot be optimized, the vehicle controller 208 may control the packet transmission rate over a single connection. For example, if a vehicle 102 is only equipped with a single WiFi wireless LAN adapter, the vehicle controller 208 may proactively decrease the value of the TCP congestion window parameter as the vehicle 102 approaches a location with poor wireless connectivity, or use a similar technique with a non-TCP data stream. The vehicle controller 208 may inform the communication system 206 of the impending maximum allowed data transmission rate change in order to prevent link congestion, as well as inform the component of the vehicle 102 generating the data stream of the impending changes in order to enable it to adjust the data stream bit rate accordingly.

In a further embodiment, the vehicle controller 208 may use positioning data obtained from nearby vehicles 102 or roadside infrastructure units 150 equipped with a positioning system via VANET communications in case the vehicle positioning system is out of service, missing, or otherwise incapable of providing positioning information in a timely manner. The vehicle controller 208 may furthermore correct positioning data using information on relative positioning of the source and the recipient based on signal round-trip time, LIDAR, radar, or optical measurements, and other signals.

In an embodiment, the vehicle controller 208 determines optimal network parameters based on a utility function that can be used to rank possible outcomes according to some preference guidelines. For example, in an embodiment, the utility function performs an optimization function (e.g., a Pareto-efficient frontier computation) on a weighted polynomial based on latency and a weighted polynomial based on throughput to generate a utility function output value. For example, the utility function may be used to find a solution that provides the lowest latency at a throughput rate greater than or equal to some predefined threshold value. The utility function may also depend on environmental parameters such as current vehicle speed. In an embodiment, input parameters to the utility function may be subject to complex, non-linear interdependencies. For example, as the vehicle speed increases, the number of wireless connectivity errors may increase, degrading throughput and detrimentally affecting video feed frame delivery latency, but a growing latency may impose limits on the maximum vehicle speed.

In an embodiment, the vehicle controller 208 applies a transport protocol congestion control algorithm that models the network conditions and predicts its capacity at the next time step, or reacts to a current state. Transport protocols may account for the risks involved with undershooting or overshooting predicted network congestion and balance low latency and high throughput depending on their design goals and acceptable trade-offs. In an embodiment, an algorithm may use the utility function to rank possible performance results presented as input vectors in a multidimensional space, select data points on the convex hull corresponding to the Pareto-optimal frontier, and use application-dependent logic to select a single input vector as the optimal candidate among its peers that also produce Pareto-optimal results.

In a further embodiment, the vehicle controller 208 may use third-party data on major events that may affect traffic conditions as well as wireless network conditions to make decisions about data transmission rates. For example, an announcement of a concert, a football match or a public protest implies a vast concourse of humans, vehicles, or both in a designated area that is likely to cause network congestion.

Figure 3A:
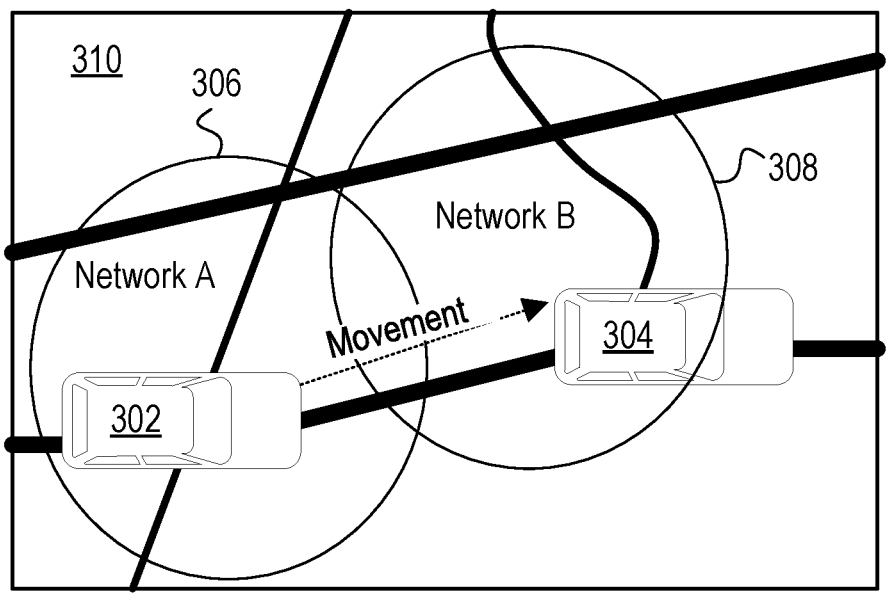
FIG. 3A illustrates an example embodiment of a vehicle traveling between locations having network coverage areas associated with different networks.
Figure 3B:
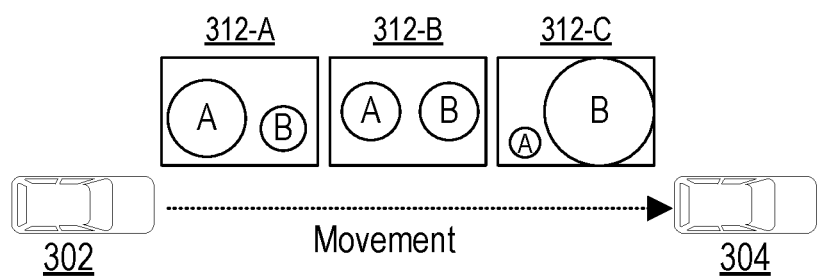
FIG. 3B illustrates an example embodiment of a technique for allocating network bandwidth of multiple networks to a vehicle traveling between locations.

FIGS. 3A-B illustrate an example embodiment of a technique for controlling the network data load on two different networks. In FIG. 3A, vehicle positions 302, 304 at two different points in time are superimposed on a road map 310. The circles 306, 308 overlaid on the map 310 indicate the zones of efficient wireless network coverage for the disjoint networks A and B. FIG. 3B represents the changes occurring in the network environment during vehicle motion. Here, the size of each circle in subpanels 312-A, 312-B, 312-C indicates the maximum performance attainable with reasonable probability for each network A, B at a corresponding location along the vehicle path between positions 302, 304. As can be seen, the vehicle 102 transitions from communicating primarily using network A to communicating primarily using network B as its position changes relative to the respective coverage areas of the networks A, B.

Figure 4:
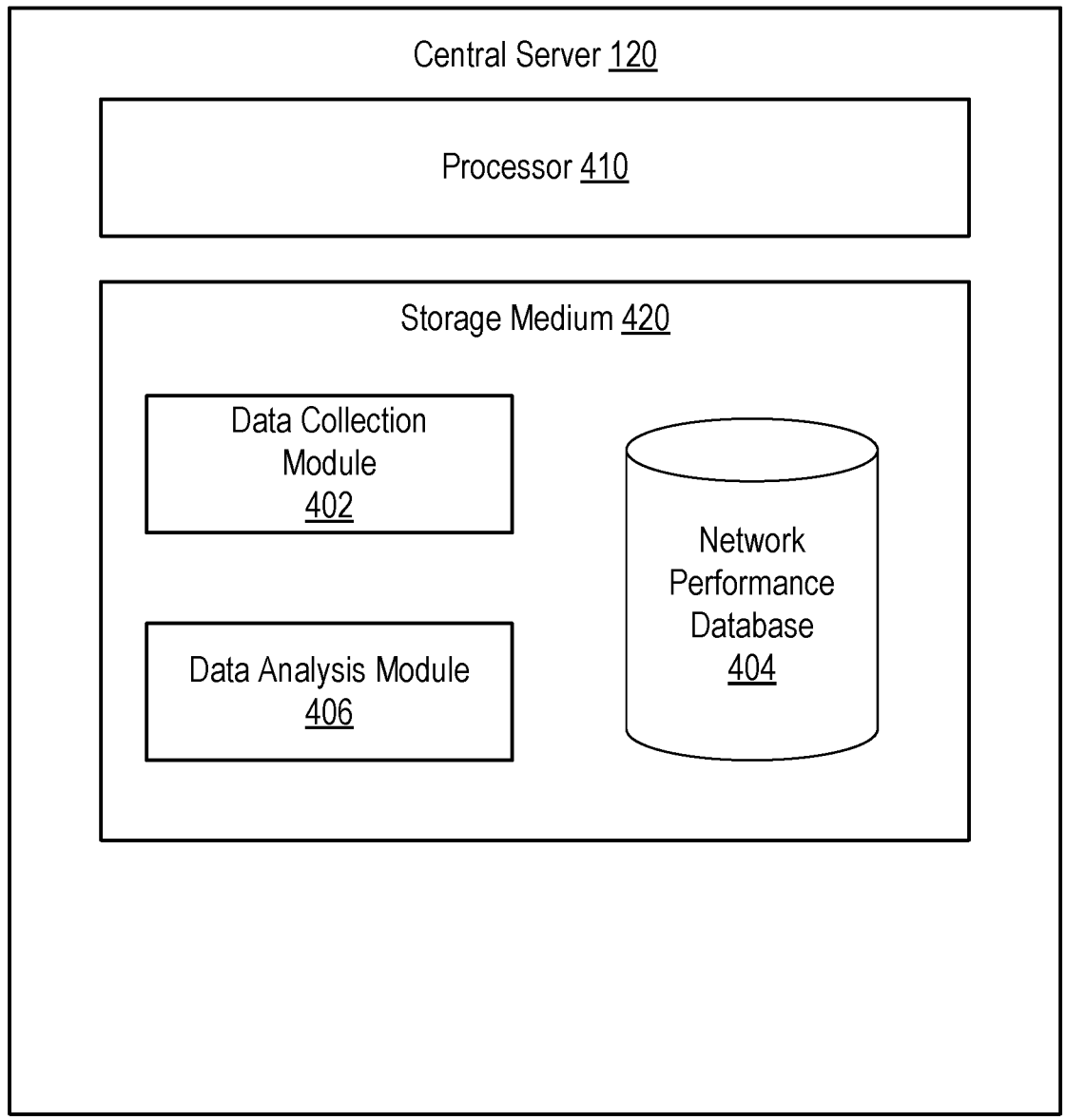
FIG. 4 illustrates an example embodiment of a central server for collecting and distributing network performance data to vehicles.

FIG. 4 illustrates an example embodiment of the central server 120. The central server comprises a processor 410 and a storage medium 420 (e.g., a non-transitory computer readable storage medium) that stores instructions that when executed by the processor 410 causes the processor 410 to perform steps attributed to the central server 120 described herein. In an embodiment, the storage medium 420 stores a data collection module 402, a network performance database 404, and a data analysis module 406.

The data collection module 402 collects geographically bound datasets to obtain empirical data of network conditions relative to a particular geographic area and stores the data to the network performance database 404. For example, the data collection module 402 may collect data relating to latency and signal strength of network devices 145 (e.g., cellular base nodes). In an embodiment, the data collection module 402 obtains data from vehicles 102 driving along desired routes while transmitting a predefined data stream according to predefined data transmission parameters. These parameters may include, for example, a selected bit rate and a network congestion window parameter (e.g., the TCP cwnd parameter in case of a TCP data stream) that controls how much data is transmitted before requiring an acknowledgement signal. During the data collection, the data stream contains sufficient information for the data analysis module 406 to be able to extract actual transmission latency (such as TSVAL and TSECR packet headers in case of a TCP data stream). In an embodiment, the obtained data stream either mimics a data stream of the desired nature (such as an H.264-encoded camera video feed), or may be pseudo-randomly generated. The data collection process may be repeated with different values for the congestion window parameter and the data transmission rate. The vehicle 102 may upload the data to the data collection module 402 either upon a trigger (for example, the vehicle 102 returning to base location), or at regular intervals. While providing data to the data collection module 402, the vehicle 102 may be controlled to move at a speed comparable to expected speeds of vehicles 102 that will subsequently use the collected data, since observed wireless network characteristics may vary widely depending on the rate at which a vehicle 102 approaches or recedes from a network device 145, causing a switch between modulation schemes and other techniques. In an embodiment, the data collection module 402 may collect data from the vehicle 102 traveling at different speeds within the legal limits to obtain data corresponding to a range of different permissible speeds.

In a further embodiment, the data collection module 402 collects data repeatedly at different local times in order to take into account diurnal network performance variations. For example, some areas are susceptible to wireless connectivity degradation during morning and evening rush hours, and this approach would allow the data collection module 402 to obtain and utilize this information. In a further embodiment, the data collection module 402 collects data repeatedly (for example, every month) in order to supply the network performance database 404 with updated information reflecting long-term changes in the network 140, both periodic and permanent. For example, this approach would allow the network performance database 404 to track changes in radio wave propagation due to construction or demolition of buildings, changes in cellular base node locations and capacity.

Data from the network performance database 404 may be periodically distributed to the vehicles 102 for storage in the local geospatial databases 210. Here, the central server 120 may distribute data relevant to each vehicle's present and predicted future states such that the subsets of data distributed to each vehicle 102 are geographically localized.

Figure 5:
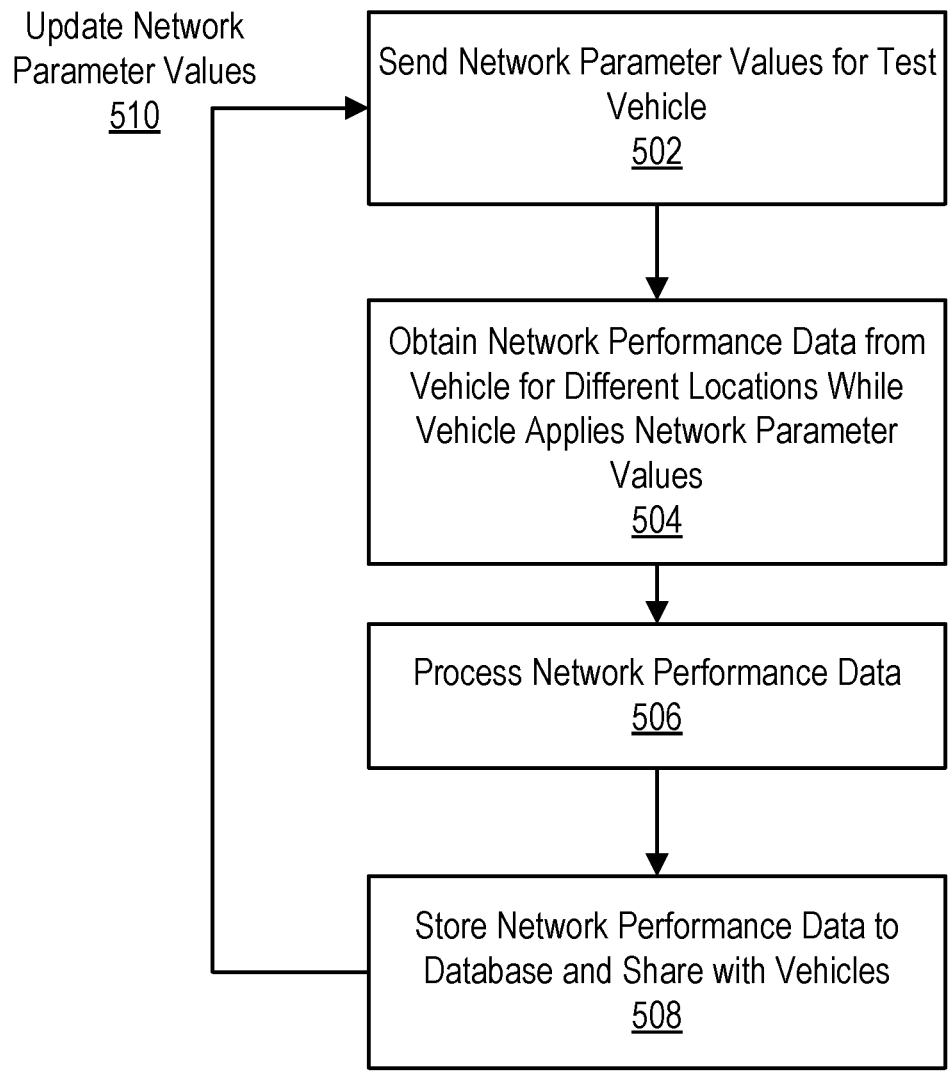
FIG. 5 is a flowchart illustrating an example embodiment of a process for collecting network performance data.

FIG. 5 illustrates an embodiment of a process for learning network congestion levels associated with geographic locations. Particularly, the data collection module 402 sets 502 values of network parameters (e.g., a congestion window and data stream rate) to predefined values and provides the values to a test vehicle 102. The data collection module 402 then obtains 504 network performance data from the test vehicle 102 for each of a series of locations. Here, the network performance data may include, for example, observed latency for each network device 145 the vehicle 102 connects with or each modem the vehicle 102 uses for transmission, current coordinates and velocity of the vehicle 102, timestamp, and signal-to-noise ratings for each network device 145. In the case that the vehicle 102 is traversing enclosed locations (e.g., parking garages) that are likely to have low reliability of satellite positioning systems such as GPS, vehicle localization may instead be performed using alternative means, such as simultaneous location and mapping (SLAM) based on LIDAR or stereo computer vision data, tire rotation modeling in combination with inertial measurement unit (IMU) data, or triangulation with radio beacons such as Bluetooth Low Energy (BLE). The data analysis module 406 processes 506 the received data. Processing may include actions such as merging the vehicle data with empirical weather data, empirical lighting data, parking lot occupancy data, or climate microcell modelling results and urban vehicle traffic empirical data or modelling results. The data analysis module 406 stores 508 the processed data to the data collection database 404 for subsequent analysis and distribution to vehicles 102 for storage in the local geospatial databases 210. The process may then repeat 510 for different network parameter values.

Figure 6:
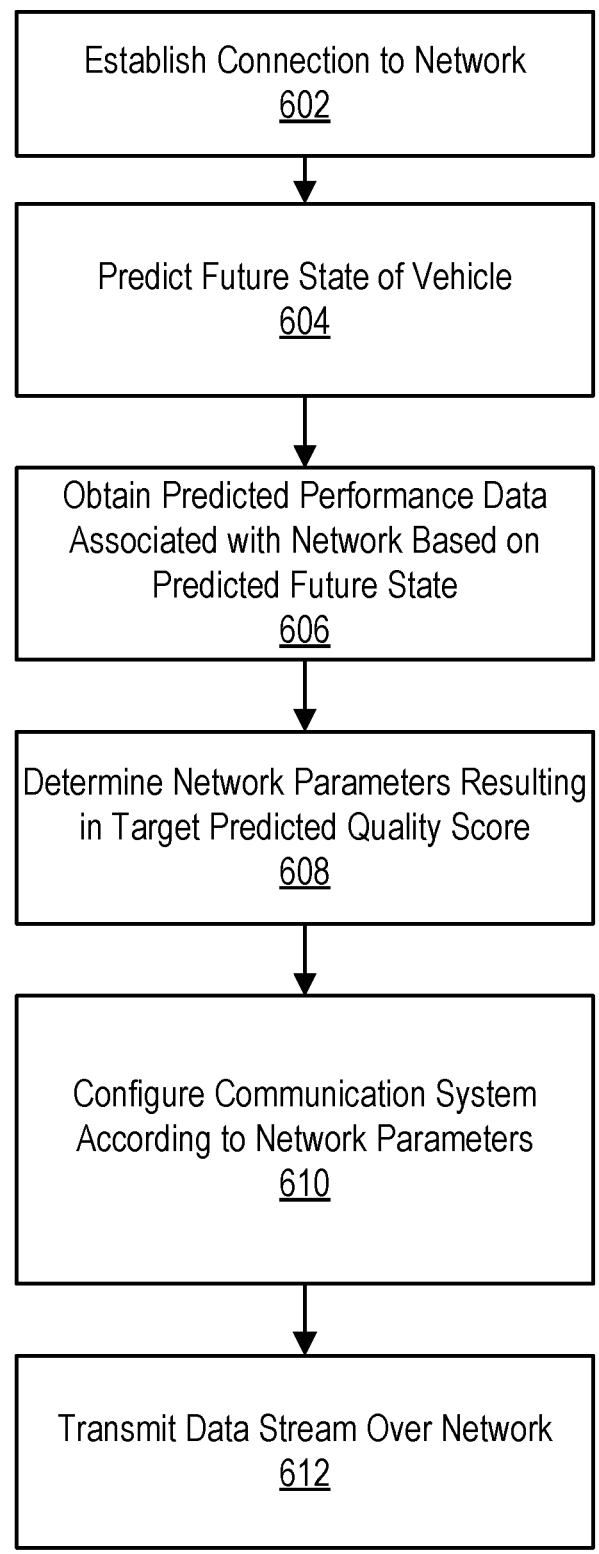
FIG. 6 is a flowchart illustrating a first example embodiment of a process for determining network parameters for a network connection of a vehicle to a plurality of networks.

FIG. 6 illustrates an embodiment of a process for determining network parameters (e.g., congestion window and bit rate values) for transmitting data based on the vehicle state and obtained network performance data. The vehicle 102 establishes 602 a connection to a network 140. The vehicle controller 208 predicts 604 a future state of the vehicle 102 including, for example, a future location and/or velocity of the vehicle 102. The vehicle controller 208 obtains 606 predicted performance data associated with the network connection based on the predicted future state of the vehicle 102. For example, the vehicle controller 208 performs a lookup in the geospatial database 210 that maps vehicle states to learned network performance data collected and distributed by the central server 120 as described above. The vehicle controller 208 determines 608 network parameters that result in a target predicted quality score. The network parameters may comprise, for example, a congestion window value, total data stream bit rate value over a network 140, or other parameters. In an embodiment, the target predicted quality score represents an optimal predicted achievable quality for the network connection as indicated by the geospatial database 210. Here, the quality score may be computed based on a plurality of different network performance attributes such as, for example, throughput, latency, or other attributes. The vehicle controller 208 configures 610 the communication system 206 according to the determined network parameters that enable the vehicle 102 to achieve the target quality score. The vehicle 102 may then transmit 612 a data stream over the network 140 in accordance with its configuration. In an embodiment, the above described process may be repeated periodically or upon occurrence of a trigger event to update the network parameters at different time intervals.

Furthermore, in an embodiment, the above described process may be performed in parallel for multiple network connections to different networks. For example, in an embodiment, a particular payload data stream may be transmitted redundantly over two different networks 140 that are each independently configured according to the above process. The receiver of the data stream (e.g., a remote support terminal 110) may then select between the different data stream (e.g., selecting the data stream received with lowest latency). Multiple payload data streams may be transmitted redundantly over different pairs of networks 140 if the vehicle 102 is connected to more than two wireless networks simultaneously.

Figure 7:
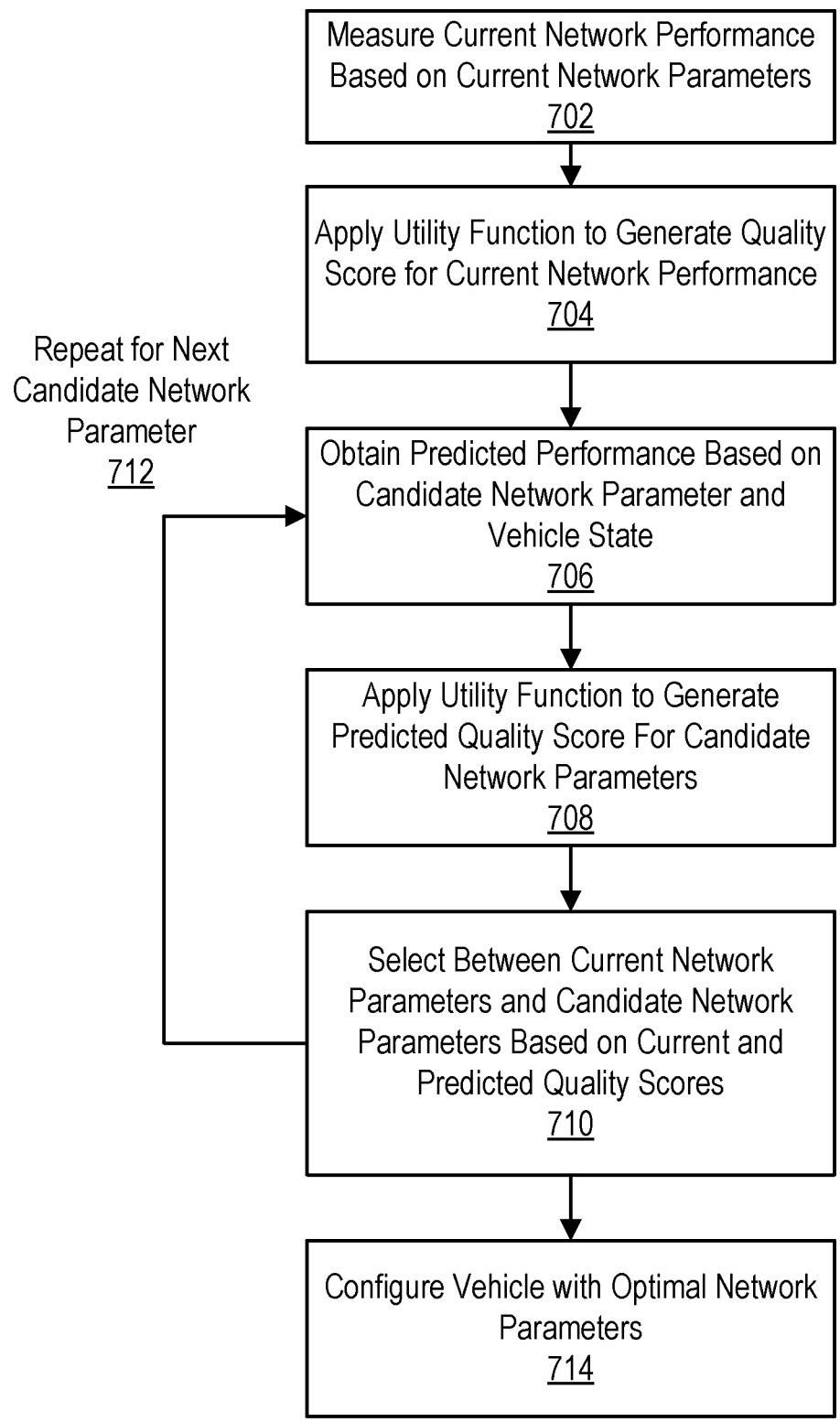
FIG. 7 is a flowchart illustrating a second example embodiment of a process for determining network parameters for a network connection of a vehicle to a plurality of networks.

FIG. 7 illustrates another embodiment of a process for determining optimal network parameters (e.g., congestion window and bit rate values) for transmitting data based on the vehicle state and the obtained network performance data. In this embodiment, the vehicle controller 208 uses the predefined utility function to determine whether the network connection parameters (e.g., congestion window value) for any of the available wireless connections should be adjusted. The vehicle controller 208 measures 702 current network performance based on the vehicle's current network parameters. For example, the network parameters may control the current congestion window value for a single wireless network path and measurements on its performance. The performance measurement may include, for example, throughput and latency. Additionally, the measurements may include, for example, transmission bitrate, round-trip time, advertised packet loss rate, and other relevant measurements. The utility function is applied 704 to the measured network performance values to obtain a quality score representing quality of the current network connection. For a next candidate network parameter value, the vehicle controller 208 obtains 706 predicted performance values from the geospatial database 210 based on the candidate network parameter values and the current vehicle state (e.g., the vehicle's predicted position and speed at a next time step). The vehicle controller 208 applies 708 the utility function to the predicted performance values obtained from the geospatial database 210 to obtain a predicted quality score for the candidate network parameter value. The vehicle controller 208 then selects 710 between the current network parameter values and the candidate network parameter value that results in the high quality score. The vehicle controller 208 may repeat 712 the computation for a range of different candidate network parameter values. Once the vehicle controller 208 cycles through the range of values, the vehicle controller 208 configures the vehicle 102 with the optimal network parameter value that resulted in the highest quality score. The vehicle controller 208 then configures 714 the communication system 206 with the optimal network parameters.

In a further embodiment, the utility function and the corresponding network parameter selection algorithm are designed to directly support multipath connections. Here, the utility function accounts for the total multipath connection latency being determined by the path with the highest latency, and the total multipath connection throughput being determined by the sum of path throughput values, or derivative parameters depending on these characteristics.

In a further embodiment, the utility function and the corresponding network parameter selection algorithm are designed to take into account throughput and latency costs imposed by switching the active connection of a wireless connectivity device. For instance, a vertical handover in a cellular network may cause packet loss if the transmission buffer was not copied from the previous cellular node to the next one; resetting a WiFi connection and establishing a new one to a different hotspot may also cause the path to be unavailable for as long as the new connection is being negotiated.

In a further embodiment, the utility function and the corresponding network parameter selection algorithm are designed to take into account the latency or packet loss induced by the estimated levels of buffer bloat in a wireless network 140 generated by data transmission over that network 140 during a prior time interval.

In an alternative embodiment, the vehicle controller 208 keeps a precomputed database of scores for the full supported set of network parameter values or a subset thereof, and for the full set of supported vehicle speed values or a subset thereof. The subsets to be loaded may be chosen randomly, probabilistically, or in any other manner deemed suitable.

In an alternative embodiment, instead of storing a geospatial database 210 at the vehicle 102, the vehicle controller 208 instead obtains from the central server 120 a multivariate differentiable function or a plurality thereof with non-intersecting domains. This function may be derived by the central server 120 based on the obtained data and represents a learned relationship between the vehicle state and optimal network parameters. The function (or functions) may be applied by the vehicle controller 208 to interpolate utility function scores to values of input parameters such as vehicle speed that have no corresponding direct measurement. Alternatively, functions may be defined over intersecting domains while supporting a mechanism for ranking and selection of a specific function among candidates defined for a given point.

In a further embodiment, the vehicle controller 208 cross-validates values obtained from the geospatial database 210 (for instance, cellular node signal-to-noise ratios) with their observed counterparts. This allows the vehicle controller 208 to perform a check of the selected network parameter value, and skip a network parameter value update if the difference between the observed and the stored values is higher than a predefined threshold difference. Such an anomaly of observed input parameters may further be logged or reported for subsequent analysis. If the observational values match the corresponding stored parameters, the optimal network parameter value is applied to the wireless path. After an empirically determined cooldown value, the system starts monitoring the path in order to determine if the observed changes in performance characteristics match predictions. If they do with an appropriate degree of precision, the update is determined to be a success. Otherwise the previous network parameter value is restored, and the anomaly may further be logged or reported for subsequent manual expert analysis.

Figure 8:
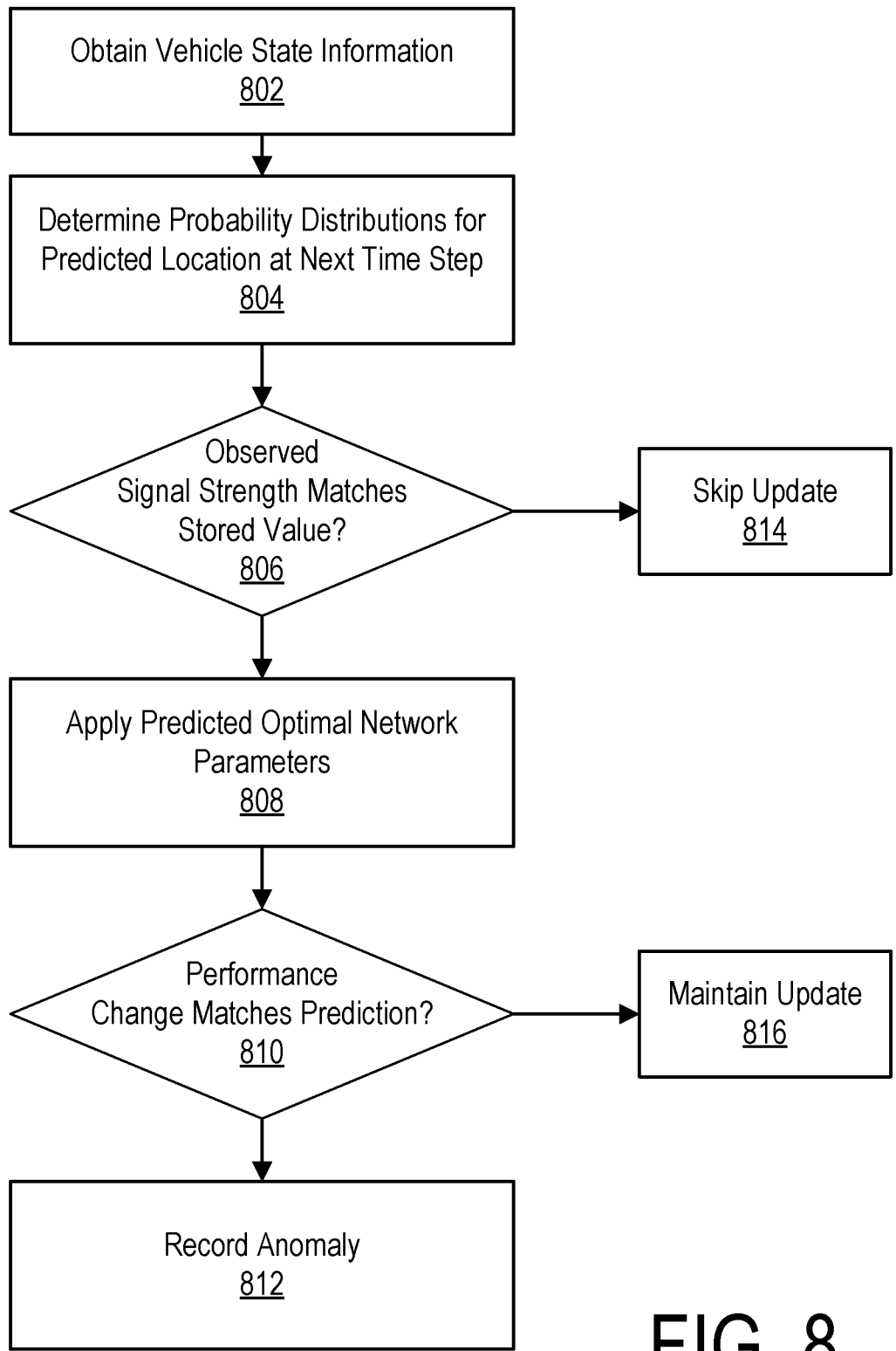
FIG. 8 is a flowchart illustrating a third example embodiment of a process for determining network parameters for a network connection of a vehicle to a plurality of networks.

FIG. 8 illustrates an example embodiment of a process for updating network parameter values for data transmissions from a vehicle 102. The vehicle controller 208 obtains 802 the vehicle state (e.g., position, velocity, and information about surrounding environment or obstacles). The vehicle controller 208 determines 804 probability distributions representing a predicted location of the vehicle 102 at the next time step. The vehicle controller 208 then determines 806 if the observed signal strength values of the network connection match stored values. If the signal strength does not match the stored values, the vehicle controller 208 skips 814 the update. Otherwise, the vehicle controller 208 applies 808 the predicted optimal network parameters for the predicted vehicle state at the next time step based on information in the geospatial database 210. The vehicle controller 208 then determines 810 if the change in performance from the updated network parameters matches the predicted improvement with an appropriate degree of precision. If the observed performance change does not match the predicted improvement, an anomaly may be recorded 812 and the network parameter values may revert to the previous values. Otherwise, the vehicle controller 208 maintains 816 the update.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for controlling network parameters of a vehicle, the method comprising:
   establishing, by the vehicle, a first connection to a first network;
   predicting based on sensed information of the vehicle, a predicted future state of the vehicle including future position information;
   obtaining first network performance data of the first network associated with the predicted future state of the vehicle;
   determining, based on the first network performance data, first network parameters associated with the first connection to the first network that result in a first target predicted quality score associated with the first connection;
   configuring a communication system of the vehicle according to the first network parameters;
   transmitting, by the communication system, a first data stream over the first network;
   measuring performance of the first connection to the first network;
   determining if the measured performance sufficiently matches performance associated with the first target predicted quality score; and
   responsive to the measured performance sufficiently matching, recording a successful update of the first network parameters.

2. The method of claim 1, further comprising:
   establishing, by the vehicle, a second connection to a second network concurrently with the first connection to the first network;
   obtaining second network performance data of the second network associated with the predicted future state of the vehicle;
   determining, based on the second network performance data, second network parameters associated with the second connection to the second network that result in a second target predicted quality score associated with the second connection;
   configuring the communication system of the vehicle according to the second network parameters; and
   transmitting, by the communication system, a second data stream over the second network.

3. The method of claim 2, wherein the second data stream includes data redundant to the first data stream.

4. The method of claim 2, further comprising:
   measuring performance of the second network connection;
   determining if the measured performance sufficiently matches performance associated with the second target predicted quality score;
   responsive to the measured performance not sufficiently matching, recording an anomaly with respect to the second performance data retrieved from a geospatial database.

5. The method of claim 1, wherein determining the first network parameters comprises:
   determining, from a geospatial database, a plurality of predicted candidate quality scores resulting from a range of candidate network parameters; and
   identifying the first network parameters from the candidate network parameters that results in the first target predicted quality score.

6. The method of claim 1, wherein determining the first network parameters comprises:
   obtaining a first predicted performance value associated with a first performance attribute based on the predicted future state of the vehicle;
   obtaining a second predicted performance value associated with a second performance attribute based on the predicted future state of the vehicle; and
   applying a predefined utility function to the first predicted performance value and the second predicted performance value to generate the first target predicted quality score.

7. The method of claim 1, wherein the first network performance data in a geospatial database is obtained according to a data collection process comprising obtaining network performance data for a population of vehicles operating at different locations while applying a range of different network parameters.

8. The method of claim 1, wherein the first network parameters comprise at least one of a congestion window value and a bit rate.

9. The method of claim 1, wherein determining the first network parameters comprises:
   receiving one or more functions mapping the predicted future state of the vehicle to a set of candidate quality scores for a range of network parameters;
   applying the one or more functions to the predicted future state of the vehicle; and
   identifying network parameters associated with first target predicted quality score selected from the set of candidate quality scores.

10. A non-transitory computer-readable storage medium storing instructions for controlling network parameters of a vehicle, the instructions when executed by a processor causing the processor to perform steps including:
    establishing, by the vehicle, a first connection to a first network;
    predicting based on sensed information of the vehicle, a predicted future state of the vehicle including future position information;
    obtaining first network performance data of the first network associated with the predicted future state of the vehicle;
    determining, based on the first network performance data, first network parameters associated with the first connection to the first network that result in a first target predicted quality score associated with the first connection;
    configuring a communication system of the vehicle according to the first network parameters;
    transmitting, by the communication system, a first data stream over the first network,
    measuring performance of the first connection to the first network;
    determining if the measured performance sufficiently matches performance associated with the first target predicted quality score; and
    responsive to the measured performance sufficiently matching, recording a successful update of the first network parameters.

11. The non-transitory computer-readable storage medium of claim 10, the instructions when executed further causing the processor to perform steps including:
    establishing, by the vehicle, a second connection to a second network concurrently with the first connection to the first network;
    obtaining second network performance data of the second network associated with the predicted future state of the vehicle;

determining, based on the second network performance data, second network parameters associated with the second connection to the second network that result in a second target predicted quality score associated with the second connection;
configuring the communication system of the vehicle according to the second network parameters; and
transmitting, by the communication system, a second data stream over the second network.

12. The non-transitory computer-readable storage medium of claim 11, wherein the second data stream includes data redundant to the first data stream.

13. The non-transitory computer-readable storage medium of claim 11, the instructions when executed further causing the processor to perform steps including:
measuring performance of the second network connection;
determining if the measured performance sufficiently matches performance associated with the second target predicted quality score;
responsive to the measured performance not sufficiently matching, recording an anomaly with respect to the second performance data retrieved from a geospatial database.

14. The non-transitory computer-readable storage medium of claim 10, wherein determining the first network parameters comprises:
determining, from a geospatial database, a plurality of predicted candidate quality scores resulting from a range of candidate network parameters; and
identifying the first network parameters from the candidate network parameters that results in the first target predicted quality score.

15. The non-transitory computer-readable storage medium of claim 10, wherein determining the first network parameters comprises:
obtaining a first predicted performance value associated with a first performance attribute based on the predicted future state of the vehicle;
obtaining a second predicted performance value associated with a second performance attribute based on the predicted future state of the vehicle; and
applying a predefined utility function to the first predicted performance value and the second predicted performance value to generate the first target predicted quality score.

16. The non-transitory computer-readable storage medium of claim 10, wherein the first network performance data in a geospatial database is obtained according to a data collection process comprising obtaining network performance data for a population of vehicles operating at different locations while applying a range of different network parameters.

17. The non-transitory computer-readable storage medium of claim 10, wherein the first network parameters comprise at least one of a congestion window value and a bit rate.

18. A vehicle system comprising:
a drive system;
a plurality of vehicle sensors;
a processor; and
a non-transitory computer-readable storage medium storing instructions for controlling network parameters of a vehicle, the instructions when executed by the processor causing the processor to perform steps including:
establishing, by the vehicle, a first connection to a first network;
predicting based on sensed information of the vehicle, a predicted future state of the vehicle including future position information;
obtaining first network performance data of the first network associated with the predicted future state of the vehicle;
determining, based on the first network performance data, first network parameters associated with the first connection to the first network that result in a first target predicted quality score associated with the first connection;
configuring a communication system of the vehicle according to the first network parameters;
transmitting, by the communication system, a first data stream over the first network;
measuring performance of the first connection to the first network;
determining if the measured performance sufficiently matches performance associated with the first target predicted quality score; and
responsive to the measured performance sufficiently matching, recording a successful update of the first network parameters.

19. The vehicle system of claim 18, wherein the instructions when executed by the processor further cause the processor to perform steps including:
establishing, by the vehicle, a second connection to a second network concurrently with the first connection to the first network;
obtaining second network performance data of the second network associated with the predicted future state of the vehicle;
determining, based on the second network performance data, second network parameters associated with the second connection to the second network that result in a second target predicted quality score associated with the second connection;
configuring the communication system of the vehicle according to the second network parameters; and
transmitting, by the communication system, a second data stream over the second network.

20. The vehicle system of claim 19, wherein the second data stream includes data redundant to the first data stream.

* * * * *